United States Patent
Lindgren et al.

(10) Patent No.: US 7,912,615 B2
(45) Date of Patent: Mar. 22, 2011

(54) METHOD FOR GEAR SELECTION DURING DRIVING OF A VEHICLE IN A HEAVY UPHILL DRIVE CONDITION

(75) Inventors: Anders Lindgren, Göteborg (SE); Sixten Berglund, Torslanda (SE); Peter Templin, Frölunda (SE); Anders Eriksson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 446 days.

(21) Appl. No.: 12/096,617

(22) PCT Filed: Dec. 9, 2005

(86) PCT No.: PCT/SE2005/001892
§ 371 (c)(1),
(2), (4) Date: Aug. 29, 2008

(87) PCT Pub. No.: WO2007/067115
PCT Pub. Date: Jun. 14, 2007

(65) Prior Publication Data
US 2009/0093936 A1   Apr. 9, 2009

(51) Int. Cl.
*G06F 17/00* (2006.01)
(52) U.S. Cl. ............... 701/55; 701/56; 701/65
(58) Field of Classification Search ............ 701/51, 701/55, 56, 54, 53, 61, 65, 95; 477/107, 477/110, 108, 111, 115, 120
See application file for complete search history.

(56) References Cited

U.S. PATENT DOCUMENTS

| | | | |
|---|---|---|---|
| 4,982,805 A | 1/1991 | Naitou et al. | |
| 5,010,490 A | 4/1991 | Naito et al. | |
| 5,154,250 A | 10/1992 | Murai | |
| 5,908,461 A | 6/1999 | Tsukamoto et al. | |
| 6,516,261 B2 * | 2/2003 | Ohashi et al. | 701/51 |
| 7,337,049 B2 * | 2/2008 | Sakakibara et al. | 701/48 |
| 7,479,091 B2 * | 1/2009 | Yang | 477/108 |

FOREIGN PATENT DOCUMENTS

| | | |
|---|---|---|
| DE | 10106935 A1 | 8/2002 |
| DE | 10260007 A1 | 7/2004 |
| EP | 0532957 A2 | 3/1993 |
| WO | 2004010031 A1 | 1/2004 |

OTHER PUBLICATIONS

International Search Report from corresponding International Application No. PCT/SE2005/001892.
European Search Report for corresponding E 05 80 4970.

* cited by examiner

*Primary Examiner* — Richard M. Camby
(74) *Attorney, Agent, or Firm* — WRB-IP LLP

(57) ABSTRACT

A method for gear selection during driving of a vehicle in a heavy uphill drive condition is provided, the vehicle including an engine, an automated mechanical transmission, a clutch, a control unit for receiving input signals including signals indicative of vehicle speed, engaged ratio of the transmission, rotational speed of the engine, rotational speed of a input shaft and displacement of a throttle control for engine torque request, and for processing the signals in accordance with programmed logic rules to issue command output signals to the engine, to the transmission and to said clutch. When sensing a heavy uphill drive condition a target gear is determined for the uphill drive condition, the target gear being the highest possible gear with lowest possible gear ratio where the vehicle, in view of at least current circumstances, will be at least theoretically able to hold a constant vehicle speed or accelerate at least slightly, and where further selection of downshifts will be adapted so that no lower gear than the target gear will be selected and engaged.

10 Claims, 4 Drawing Sheets

METHOD FOR GEAR SELECTION DURING DRIVING OF A VEHICLE IN A HEAVY UPHILL DRIVE CONDITION

BACKGROUND AND SUMMARY

The present invention relates to a method for automatically identifying heavy uphill drive conditions and select appropriate gear ratios in a heavy vehicle with an Automatic Mechanical Transmission.

The invention also relates to a computer program for carrying out said method.

Automatic transmissions of the Automatic Mechanical Transmissions (AMT) type have become increasingly common in heavy-duty vehicles as microcomputer technology has continued to advance and has made it possible, with a control computer and a number of control elements, for example servo motors, to precision-control the engine speed, the connection and disconnection of an automated clutch between engine and gearbox and coupling members of the gearbox, relative to one another, so that smooth gearshift is always obtained at the correct rev speed. The advantage with this type of automatic transmission compared to a traditional automatic transmission based on a set of planetary gears and with a hydrodynamic torque converter on the input side is firstly that, particularly as regards use in heavy vehicles, it is simpler and more robust and can be produced at substantially lower cost, and secondly that it has higher efficiency, which means the prospect of lower fuel consumption.

The automatic mechanical transmissions of the type mentioned above strongly reduces the drivers gear shifting work and the driver usually will not need to worry about selecting the right next gear ratio when driving the vehicle. All this is taken care of the AMT. Even though AMT:s usually are programmed with gear shifting strategies that gives a satisfying gear selection for a great deal of the total vehicle drive situations, there still can occur situations where the selection of gears is not optimal and, in some particular cases this can lead to a difficult situation for the driver and the vehicle might even come to a stop and be unable to restart. This may be due to the limited friction at the driving wheels.

An example of such situation is when a heavy loaded vehicle is driven in a heavy uphill drive condition. Usually the continuous adaptation of the automatic selection of gears when driving is based on predetermined gear shift maps, where accelerator pedal position and engine speed are used. The gear shift maps commonly tuned to achieve a suitable engine speed after completed gear shift. The AMT-system simply tries to select a gear that is best for a particular situation. In this context it should be mentioned that some AMT-systems according to state of the art selects the best gear only based on current circumstances. There are also AMT-systems with different kinds of predictive functions for enhanced gear selection, which means that several future gear shift steps, i.e. a gear shifting sequence, can be predicted.

This means that when a heavy vehicle starts to climb an uphill road, sensing increased travel resistance, the programmed gear shifting strategy will typically make the AMT to shift down a certain number of gear steps depending on current traction power and acceleration (i.e. in an uphill state usually retardation).

As the vehicle travels further and the inclination of the uphill increases and the travel resistance increases even more, the shifting strategy will make the AMT shift down some more gear steps and one of the highest gear ratios of the AMT will be engaged. This selected high gear ratio is based on the predetermined gear shift maps.

For a given road incline there is a lowest gear ratio, where the vehicle is able to climb the road incline. If the AMT-system after a down shift ends up in a higher gear ratio than said lowest gear ratio, the vehicle speed will be lower than necessary, which means increased fuel consumption and decreased average speed. The low vehicle speed can even cause traffic jam. Another drawback of this situation is that there is a high risk that the driven wheels of the vehicle will slip, due to the heavy vehicle, high gear ratio and thus high output torque. Slip can occur even when the vehicle is driven on a dry asphalt surface. If one or more of the driven wheels starts to slip the risk for a full stop in the middle of the steep uphill is high. If the vehicle stops due to slip, the driver will have a problem to take off. The driven wheels will slip, when trying to take off, which means that the driver will have to reverse the vehicle down the steep uphill.

A typical example of a vehicle can be a truck with a trailer with a gross train weight of e.g. 60 tons. The truck can e.g. be equipped with an AMT with 14 forward gears (the two lowest gears can be crawl gears) of the type disclosed e.g. in WO02/064996.

FIG. 1 shows diagrammatically a typical steep uphill road with e.g. 15% incline and a length of approximately 150 meters from horizontal position A to elevated horizontal position B. The driver will slightly increase the depressing of an accelerator pedal arranged in the 60 tons truck when the driver sees the approaching steep uphill, thus demanding more torque.

A typical state of the art gear shift strategy for said 60-tons truck would do gear shifting as follows when passing position A with a vehicle speed of 35 km/h and 6th gear engaged. At point C the vehicle senses the inclination of the road and the retardation. This initiates a downshift. Since the vehicle is heavy, the road is steep and the retardation relatively high, the programmed shifting strategy will make the AMT shift down more than one gear step. In this case it will typically down shift from gear 6 to gear 4. The two-step down shift guarantees that the AMT will not "miss" a selected gear due to too high retardation during driving torque interruption caused by disengagement of vehicle engine and driven wheels of the vehicle (caused by e.g. clutch disengagement or putting AMT in neutral). The selected 4th gear is engaged successfully, but the retardation of the vehicle continues.

A gear will be missed if a selected gear, that the AMT tries to engage, can not be engaged. It might be a too high gear (i.e. too low gear ratio) for the current vehicle speed. The high vehicle retardation during the gear shift may be the reason for not being able to engage the gear. A missed gear could under these circumstances lead to a stop of the vehicle.

In position C a downshift is initiated as mentioned above and at position D the AMT has engaged gear 4 and a higher output torque is transferred to the driven wheels of the vehicle and the retardation is not as high as in position C, but the retardation continues. At position E the engine speed and the vehicle speed is so low that the AMT initiates another downshift. Again a multiple step down shift is selected to secure that a selected gear will not be missed. In this case gear 1 is selected, which means that there will at least theoretically be more than enough torque transferred to the driven wheels so that the truck can pull through the uphill all the way up to position B. To sum up the example as above the selected gear shifting sequence during the heavy uphill drive condition was 64-1.

If the friction between the road surface and the tires of the driven wheels is enough the truck will pull through all the way to position B with gear 1 engaged. If the driven wheels starts to slip, the vehicle will loose propulsive power and the vehicle will eventually stop in the middle of the uphill and will have severe problems to take off.

It is desirable to select a gear in a heavy uphill drive condition that is more optimized for the situation, so that average speed can be increased and fuel consumption lowered, and if a situation occurs where the driving wheels of the vehicles will slip, select a gear that minimizes the slip risk and at the same time that the vehicle can manage to pull through the whole uphill.

The method according to an aspect of the invention is a method for gear selection during driving of a vehicle in a heavy uphill drive condition, said vehicle comprising an engine with an engine output shaft connected to an automated mechanical transmission, a transmission output shaft connected to at least one driven wheel of the vehicle, at least one control unit for receiving input signals including signals indicative of vehicle speed, engaged ratio of said transmission, rotational speed of said engine, rotational speed of said input shaft and displacement of a throttle control for engine torque request, and for processing said signals in accordance with programmed logic rules to issue command output signals to said engine for torque request, to said transmission for gear shifting and to said clutch for engagement/disengagement. The method is characterized in that when sensing a heavy uphill drive condition a target gear is determined for said heavy uphill drive condition, said target gear being the highest possible gear with lowest possible gear ratio where the vehicle, in view of at least current circumstances, will be at least theoretically able to hold a constant vehicle speed or accelerate at least slightly, and where further selection of downshifts will be adapted so that no lower gear than said target gear will be selected and engaged.

The advantage of the method according to the invention is that the determined target gear is an optimized gear that gives, for a particular sensed heavy uphill drive condition the lowest fuel consumption, highest average speed, minimized risk for drive wheel slip and that the vehicle still at least theoretically will be able to pull through said heavy uphill drive condition, i.e. hold a constant vehicle speed or accelerate at least slightly the whole uphill (according to at least current sensed condition).

When a target gear has been determined, the further downshift or downshifts will be adapted to said target gear so that a lower gear than the target gear will not be engaged for a certain heavy uphill drive condition.

According to one embodiment of the method according to the invention said registration of said heavy uphill drive condition is a result of sensing at least current road inclination, current vehicle speed, current throttle control position and vehicle gross weight. Most AMT-systems already use said parameters for gear selection and there will in most cases only be needed new software to implement the functionality for identifying heavy uphill drive condition according to the invention.

According to another embodiment of the method according to the invention said determination of the target gear includes at least parameters: available vehicle engine power, vehicle gross weight, current road inclination, current vehicle speed and available total gear ratios.

According to a further embodiment of the method according to the invention, when no desire to climb the uphill anymore condition is sensed, the downshift limitation to said target gear is cancelled. The vehicle will be able to stop or drive slower than admissible with the target gear engaged.

In a further development of the last embodiment above of the invention, the "no desire to climb the uphill anymore condition" is a result of sensing at least a partly or a full release of said throttle control. The system must be able to cancel the downshift limitation to said target gear if e.g. a driver of the vehicle for some reason wants to stop or at least decrease the vehicle speed. In a further development of this embodiment said at least partly release of the throttle control is at least a 15% displacement of total displacement of the throttle control.

According to a further embodiment of the method according to the invention, the control unit senses a change of the heavy uphill drive condition during said heavy uphill drive condition and the selection of said target gear will be either updated or cancelled accordingly.

Further advantageous embodiments of the invention are described herein.

BRIEF DESCRIPTION OF THE DRAWINGS

The present invention will be described, in greater detail below with reference to accompanying drawings which, for the purpose of exemplification, shows further preferred embodiments of the invention and also the technical background.

DETAILED DESCRIPTION

Figure 1:
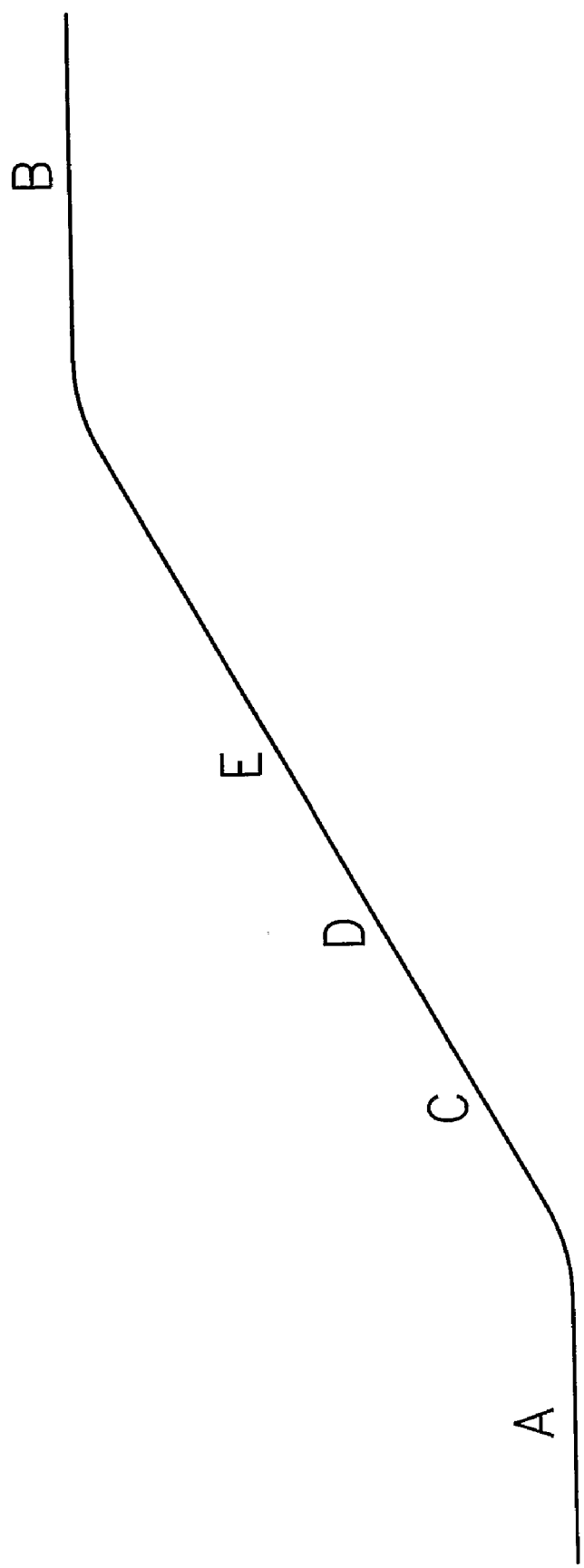
FIG. 1 shows, as described above, diagrammatically a typical steep uphill where heavy uphill condition occurs, with important positions pointed out in the uphill related to a gear shifting strategy according to prior art.
Figure 2:
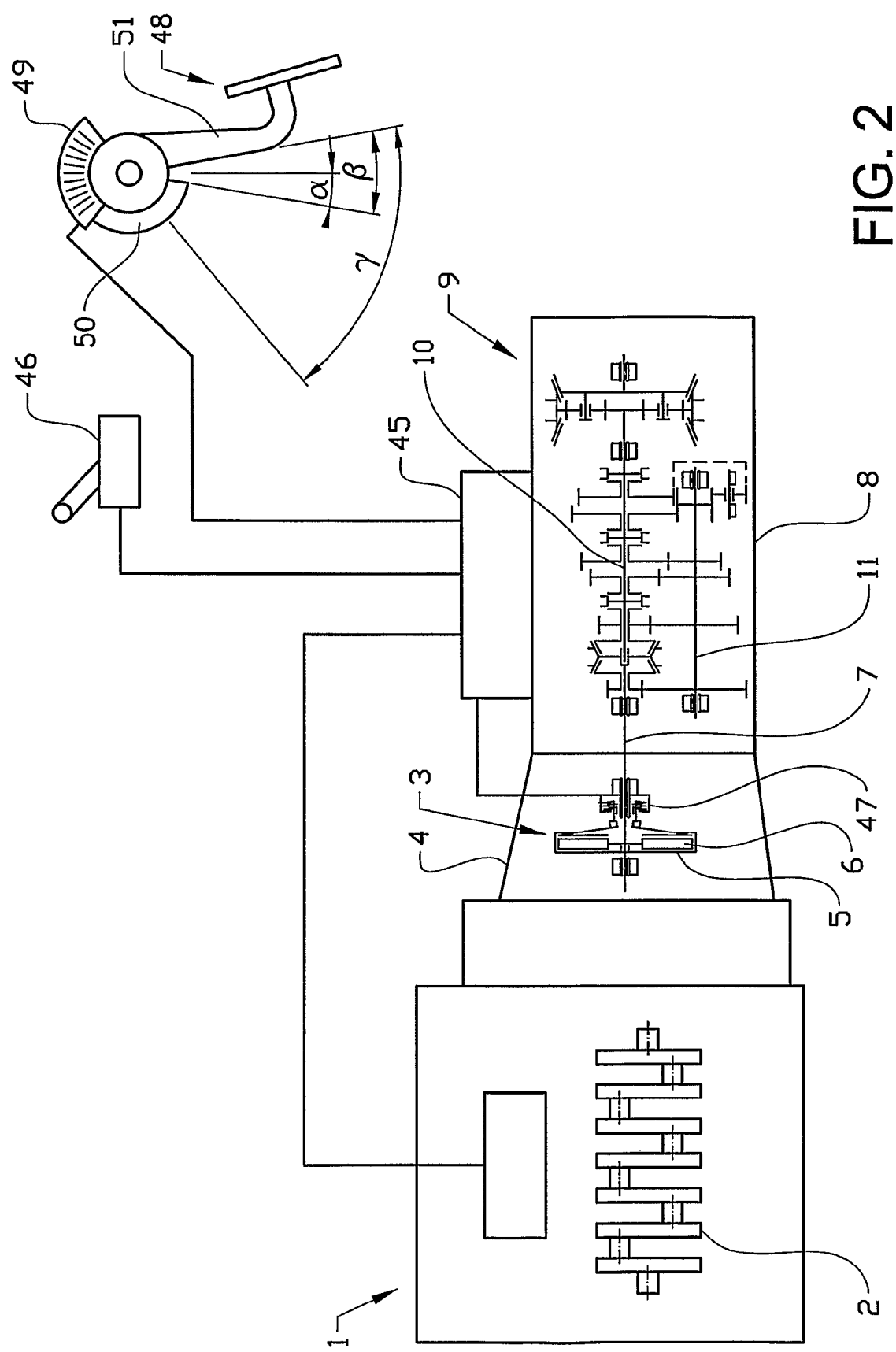
FIG. 2 shows diagrammatically a power train according to the invention.

In one embodiment the vehicle is equipped with an internal combustion engine 1, for example a diesel engine, with a crankshaft 2 which is coupled to a single-disk dry plate clutch 3, which is enclosed in a clutch case 4. The crankshaft 2 is connected, non-rotatably, to an input shaft 7, which is rotatably mounted in the housing 8 of a gearbox 9. Also rotatably mounted in the gearbox housing 8 are a main shaft 10 and an intermediate shaft 11. A gear wheel is rotatably mounted on the input shaft and can be locked on the shaft with the aid of a synchronizing device provided with a coupling sleeve, which is mounted in a non-rotatable but axially displaceable manner on a hub connected, non-rotatably, to the output shaft. With the aid of said coupling sleeve, a gear wheel rotatably mounted on the main shaft can be locked relative to the input shaft 7. With said coupling sleeve in a middle position, both said gearwheels are disengaged from their respective shafts. The above mentioned gear wheels, together with the synchronizing device and the coupling sleeve, form a splitter gear.

Disposed in a rotationally secure manner on the intermediate shaft 11 are further gear wheels, which each engage with a respective gear wheel rotatably mounted on the main shaft 10, which latter gear wheels can be locked on the main shaft with the aid of further coupling sleeves. An output end of the main shaft is arranged to via a propeller shaft drive at least a pair of wheels.

All coupling sleeves are displaceable with the aid of servo elements, which can be pneumatically operated piston cylinder devices of the type utilized in a transmission of the kind described above, which is marketed under the name I-shift.

A control unit 45 is arranged to control the different pneumatically operated piston cylinder devices for engaging different gear ratios between input shaft 7 and output shaft of the transmission according to programmed logic rules.

The torque delivered from the engine 1 is controlled by a throttle control 48 (usually accelerator pedal) in a known manner. The accelerator pedal position is obtained from an angle sensor 49. The control unit 45 also controls the fuel injection, (i.e. the engine speed and torque) depending on the accelerator pedal position, and the air supply to pneumatic piston-cylinder devices, by means of which e.g. the clutch and the synchronized splitter gear are regulated.

When a gear selector lever 46 is placed in an automatic gear selection mode, gear selections and shift decisions are made automatically by the control unit 45 based on certain measured and/or calculated parameters such as vehicle speed, engine speed, rate of change of vehicle speed, rate of change of engine speed, throttle control position, rate of change of throttle control position, actuation of a vehicle braking system, currently engaged gear ratio and the like are known from prior art.

The control unit 45 in the vehicle is according to one embodiment of the invention programmed to sense when a heavy uphill drive condition occurs. The registration of said heavy uphill drive condition is a result of sensing at least current road inclination, current vehicle speed, vehicle gross weight and accelerator pedal position. According to the invention a heavy uphill condition is registered when the vehicle has a retardation even though the accelerator pedal is pressed to its maximum (or almost maximum) displacement position (or engine delivers maximum torque or almost maximum torque) and a gear ratio bigger than a predetermined gear ratio is needed to be engaged so that the vehicle can pull through the uphill with said sensed road incline and vehicle gross weight. In an AMT with 14 forward gears said predetermined gear ratio can e.g. be the one corresponding gear 7. Thus, the gear steps with which the vehicle at least theoretically will be able to pull through said uphill will be gears 1 to 6.

When the control unit 45 senses a heavy uphill drive condition a target gear is determined for said uphill drive condition. A target gear is the highest possible gear with lowest possible gear ratio where the vehicle, in view of at least current circumstances, will be at least theoretically able to hold a constant vehicle speed or accelerate at least slightly. The control unit 45 is according to the invention programmed to adapt further selection of downshifts so that no lower gear than said target gear will be selected and engaged.

This means that when a vehicle with same weight and configuration as in FIG. 1 (i.e. gross weight 60 tons and a trailer connected) and the same starting point (i.e. 35 km/h and 6th gear engaged) and equipped with an AMT according to the invention, enters the same heavy uphill as in FIG. 1 the following will happen.

Figure 3:
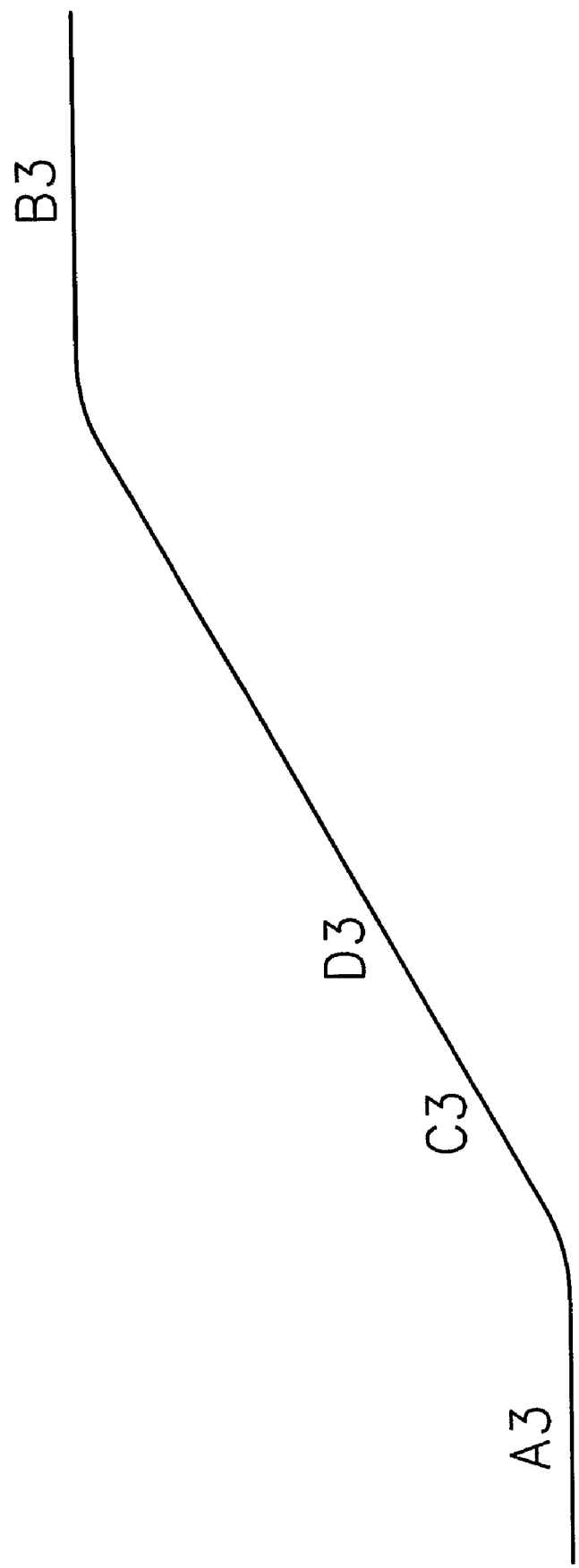
FIG. 3 shows diagrammatically the same steep uphill as in FIG. 1, but with important positions pointed out in the uphill related to a gear shifting strategy according to the invention.

FIG. 3 shows the same uphill as in FIG. 1. At horizontal position A3 the vehicle passes with a vehicle speed of 35 km/h and 6th gear engaged. At point C3 the vehicle senses the inclination of the road and the retardation. This initiates registration of a heavy uphill drive condition which according to the invention also triggers the determination of a target gear. For this particular uphill condition the control unit 45 determines that gear 3 will be the target gear.

Since the vehicle is heavy, the road according to FIG. 3 is steep and the retardation relatively high, the programmed shifting strategy will make the AMT shift down more than one gear step, since there is a risk that a gear could be "missed". The control unit 45 determines that there should be a downshift of at least 2 gear steps, but since the target gear is three gear steps down from current engaged 6th gear, and it is assumed that the same heavy uphill drive condition will prevail also during the time when the next gear is engaged, the control unit 45 will according to the invention adapt the ordinary gear shift strategy so that the next selected gear will, in this particular uphill condition, be the target gear (i.e. gear 3). The target gear is here the most optimal gear to select for this particular heavy uphill drive condition, i.e. gear 3 gives here the lowest fuel consumption, highest average speed and a minimized risk for drive wheel slip and that the vehicle still at least theoretically will be able to pull through said heavy uphill drive condition, i.e. hold a constant vehicle speed or accelerate at least slightly the whole uphill all the way up to elevated horizontal position B3.

At position D3 the AMT according to the invention has engaged target gear 3 and a higher output torque is transferred to the driven wheels of the vehicle and the retardation is not as high as in position C. The retardation will eventually cease and turn into at least constant vehicle speed or a slight acceleration of the vehicle. Thus, there is at least (in view of the in position C3 prevailing circumstance) theoretically enough torque transferred to the driven wheels so that the truck can pull through the uphill all the way up to position B3. To sum up the example of the application of the invention, the selected gear shifting sequence during the exemplified heavy uphill drive condition was 6-3 according to the invention, instead of 6-4-1, which would be the result with a state of the art AMT.

When the control unit 45 determines the target gear this procedure includes at least parameters: available vehicle engine power, vehicle gross weight, current road inclination, current vehicle speed and available total gear ratios (i.e. between engine and driven wheels). The target gear can be calculated on-line according to a programmed formula or picked out from a predetermined in the control unit 45 stored table, which table can be produced by the vehicle manufacturer before installation in the vehicle.

In a further developed embodiment of the invention the control unit 45 is programmed to sense when there is no desire to climb the uphill anymore. When such condition is sensed the control unit 45 is programmed to cancel the downshift limitation to said target gear. The establishment of said no desire to climb the uphill anymore condition can be a result of the control unit 45 sensing at least a partly or a full release of said throttle control 48. The cancellation of said downshift limitation to said target gear can be triggered by at least a partly release (alfa $\alpha$) of the throttle control 48 that can be at least for example 15% displacement of total displacement (gamma $\gamma$) of the throttle control 48.

In another further developed embodiment of the invention, the control unit 45 is programmed to repeat the sensing of the heavy uphill condition during said heavy uphill condition after a certain predetermined time or, if the control unit continuously senses said parameters, after sensing a change of the heavy uphill condition, e.g. a change in the road inclination. An increase in road inclination can according to an embodiment of the invention trigger a new selection of the target gear that probably would be a lower gear (with higher gear ratio) than the first selected target gear. A decrease in road inclination can give a higher selected target gear (with lower gear ratio) or, if the decrease of the road inclination is big enough, an establishment of that no heavy uphill drive condition is prevailing and, thus, the down shift limitation to a target gear will be cancelled.

Figure 4:
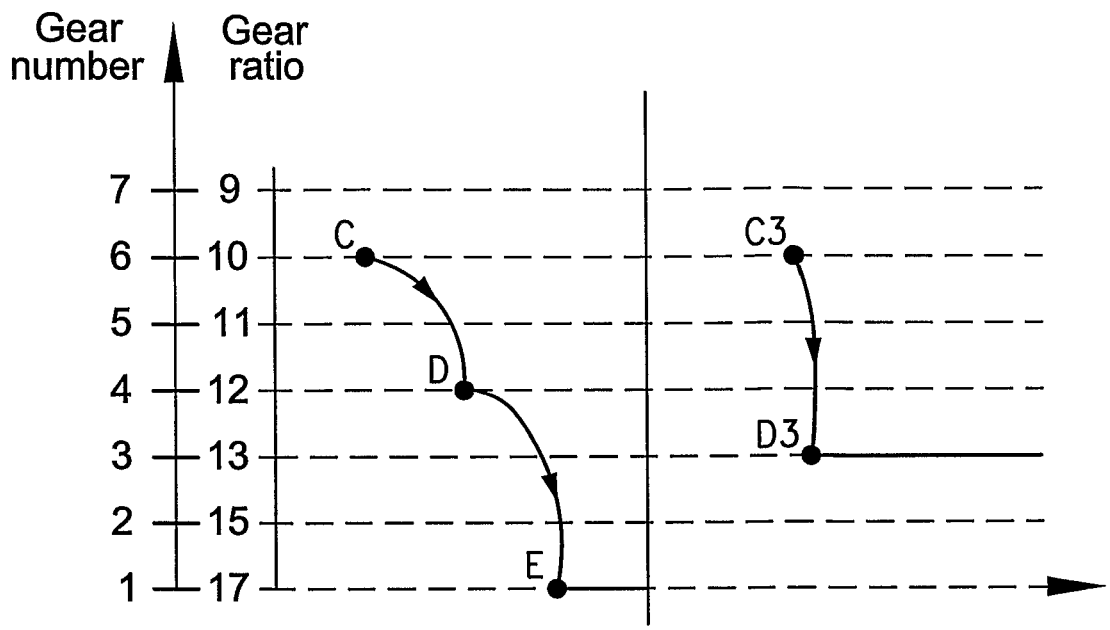
FIG. 4 discloses a direct comparison of the gear steps and the corresponding gear ratios selected in the uphill situations disclosed in FIGS. 1 and 3 respectively.

FIG. 4 discloses a direct comparison of the gears (gear numbers) and the corresponding gear ratios selected in the uphill situations disclosed in FIGS. 1 and 3 respectively. The left column shows the example of gear selection procedure according to the state of the art, which is described above under "PRIOR ART". The right column shows the example of gear selection procedure according to the invention, which is described above.

Further examples of gear selection procedures (chosen gear numbers) according to the state of the art for the same uphill condition is given below:
a) 9-6-4-2
b) 9-6-4-1
c) 9-6-3
d) 9-7-5-2
e) 8-6-4-1
f) 7-5-2
g) 7-4-2
h) 7-4-1

And here follows more examples on gear selection procedures for the same uphill condition according to the invention, i.e. where target gear 3 is chosen:
i) 9-7-3
j) 9-6-3
k) 8-6-3
l) 8-5-3
m) 7-5-3
n) 7-6-3

Figure 5:
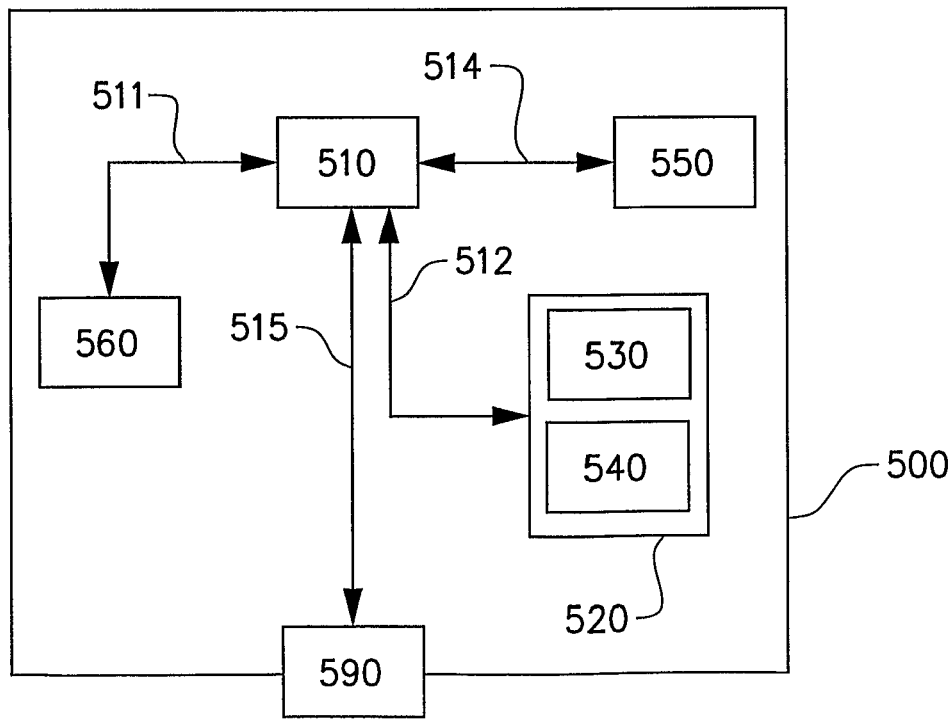
FIG. 5 shows diagrammatically a computer device that is used according to an embodiment of the invention.

FIG. 5 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for controlling the target gear selection function according to the invention is stored. In an alternative embodiment, the program for controlling the target gear selection function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for gear selection during driving of a vehicle in a heavy uphill drive condition, the vehicle comprising an engine with an engine output shaft connected to an automated mechanical transmission, a transmission output shaft connected to at least one driven wheel of the vehicle, at least one control unit for receiving input signals including signals indicative of
    engaged ratio of the transmission,
    displacement of a throttle control for engine torque request,
    and at least one of vehicle speed, rotational speed of the engine and rotational speed of the input shaft,
and for processing the signals in accordance with programmed logic rules to issue command output signals to the engine for engine control and to the transmission for gear shifting, comprising
    sensing a heavy uphill drive condition, and
    determining a target gear for the uphill drive condition, the target gear being the highest possible gear with lowest possible gear ratio where the vehicle, in view of at least current circumstances, will be at least theoretically able to hold a constant vehicle speed or accelerate at least slightly, and where further selection of downshifts will be adapted so that no lower gear than the target gear will be selected and engaged.

2. The method as claimed in claim 1, wherein the sensing of the heavy uphill drive condition is a result of sensing at least current road inclination, current vehicle speed, current throttle control position and vehicle gross weight.

3. The method as claimed in claim 1, wherein the determination of the target gear includes at least parameters: available vehicle engine power, vehicle gross weight, current road inclination, current vehicle speed and available total gear ratios.

4. The method as claimed in claim 1, wherein when sensing no desire to climb the uphill anymore condition, the downshift limitation to the target gear is cancelled.

5. The method as in claim 4, wherein establishment of the no desire to climb the uphill anymore condition is a result of sensing at least a partly or a full release of said throttle control.

6. The method as in claim 5, wherein the at least partly release of the throttle control is at least a 15% displacement of total displacement of the throttle control.

7. The method as claimed in claim 1, wherein when the control unit during an heavy uphill drive condition senses a change of the heavy uphill condition the selection of the target gear is either updated or cancelled accordingly.

8. A computer program comprising a program code for executing the method as claimed in claim 1, when the computer program is executed on a computer.

9. A computer program product comprising a program code, stored on a computer-readable medium, for executing the method as claimed in claim 1, when the computer program is executed on the computer.

10. A computer program product directly loadable into an internal memory in a computer, which computer program product comprises a computer program for executing the method as claimed in claim 1, when the computer program on the computer program product is executed on the computer.

* * * * *